United States Patent [19]
Jacke et al.

[11] 3,790,059
[45] Feb. 5, 1974

[54] ULTRASONIC APPARATUS

[75] Inventors: Stanley E. Jacke, Ridgefield; John Jugler, Danbury, both of Conn.

[73] Assignee: Branson Instruments, Incorporated, Stamford, Conn.

[22] Filed: Feb. 14, 1973

[21] Appl. No.: 332,356

Related U.S. Application Data
[63] Continuation of Ser. No. 140,700, May 6, 1971, abandoned.

[52] U.S. Cl...................... 228/1, 29/470.1, 156/580
[51] Int. Cl.............................................. B23k 1/06
[58] Field of Search.. 228/1; 29/470.1; 156/73, 580; 310/26

[56] References Cited
UNITED STATES PATENTS

| | | | |
|---|---|---|---|
| 3,493,457 | 2/1970 | Jugler | 228/1 X |
| 3,586,122 | 6/1971 | Jacke | 228/1 X |
| 3,586,589 | 6/1971 | Jugler | 228/1 X |
| 3,654,688 | 4/1972 | Setyler | 29/240 |

Primary Examiner—J. Spencer Overholser
Assistant Examiner—Robert J. Craig
Attorney, Agent, or Firm—Ervin B. Steinberg

[57] ABSTRACT

An ultrasonic apparatus for welding or assembling thermoplastic parts is constructed in modular fashion. The apparatus comprises a base having platform adapted to receive a workpiece, a vertical post extending from the base, a first enclosure means containing a power supply, and a second enclosure means containing motive means for an electro-acoustic converter. Both enclosure means, in modular fashion, are connected to each other and supported from the post at an adjustable height from the platform. The base is provided with pushbutton means. The construction shown eliminates the separate power supply and interconnecting cabling. Also, the converter is mounted for quick electrical disconnect and mechanical displacement.

14 Claims, 10 Drawing Figures

PATENTED FEB 5 1974

INVENTORS.
STANLEY E. JACKE
JOHN JUGLER

BY:

Ervin B. Steinberg

ULTRASONIC APPARATUS

This is a continuation of application Ser. No. 140,700, filed May 6, 1971 now abandoned.

The present invention refers to an ultrasonic apparatus for welding and assembling thermoplastic parts. Typical apparatus of this type are shown, for instance, in U.S. Pat. No. 3,222,239 dated Dec. 7, 1965 and U.S. Pat. No. 3,308,003 dated Mar. 7, 1967, both issued to H. Deans and entitled "Ultrasonic Sealing Apparatus," or in U.S. Pat. No. 3,493,457 issued to John Jugler on Feb. 3, 1970 entitled "Control Circuit for Tool Driven by Sonic Energy." As shown in these patents, an ultrasonic apparatus of the particular type comprises essentially a stand, a separate electrical power supply, and interconnecting cabling between the power supply and the stand. The stand, as understood in the trade, includes a base having a platform for receiving a workpiece, a post extending vertically from the base and supporting motive means to which an electro-acoustic converter is coupled. Responsive to the actuation of the converter with high frequency electrical energy and of the motive means the converter is cyclically reciprocated toward and away from the platform and provides vibratory energy to the workpiece while in contact therewith. The power supply receives electrical power at comparatively low voltage and frequency and provides by means of the interconnecting cabling high frequency electrical energy, generally in the range from 18 to 50 kHz, to the converter.

A typical electro-acoustic converter suitable for the present purpose is shown in U.S. Pat. No. 3,328,610 issued to Stanley E. Jacke et al. on June 27, 1967 entitled "Sonic Wave Generator," and an electrical circuit for energizing the electroacoustic converter is described in U.S. Pat. No. 3,432,691 issued to A. Shoh on Mar. 11, 1969 entitled "Oscillatory Circuit for Electro-Acoustic Converter." It shall be understood that the above references are merely illustrative of the prior art.

The present invention discloses an improved ultrasonic apparatus in which the stand and power supply are combined in modular fashion to provide, when assembled, a single unit or entity. Moreover, the actuating pushbuttons are incorporated in the base of the stand, thereby eliminating the need for separate pushbuttons which otherwise must be mounted to the work station.

The stand in accordance with the present disclosure is characterized by several improvements, notably extreme mechanical rigidity, absence of high voltage high frequency interconnecting cables between the power supply and the converter, and the absence of a remote power supply unit. The modular concept described and illustrated hereafter leads to a great simplification in moving the welding apparatus between work stations and provides simplified operation. The present apparatus incorporates, moreover, a simplified and improved electrical connection for the electro-acoustical converter, achieved by eliminating the usual cable and multi-contact electrical connector. Instead, an electrical contact disposed at the top of the converter is adapted to mate with a flexible leaf spring forming a part of the stand. This connection is independent of rotational orientation. A further improvement concerns the mechanical arrangement of coupling the electroacoustic converter to the motive means of the stand in such a manner as to enable a fast and convenient replacement or exchange of the converter.

Still further and other improvements relating to the new construction of the ultrasonic apparatus will be more clearly apparent from the following description when taken in conjunction with the accompanying drawings in which:

Figure 1:
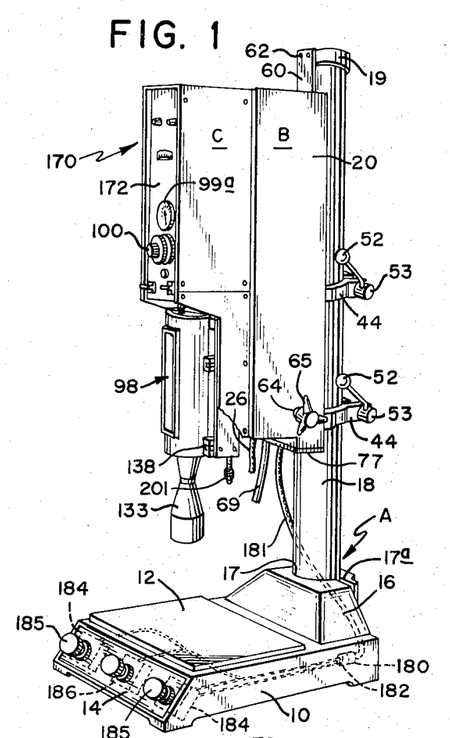
FIG. 1 is a perspective view of the assembled apparatus.
Figure 4:
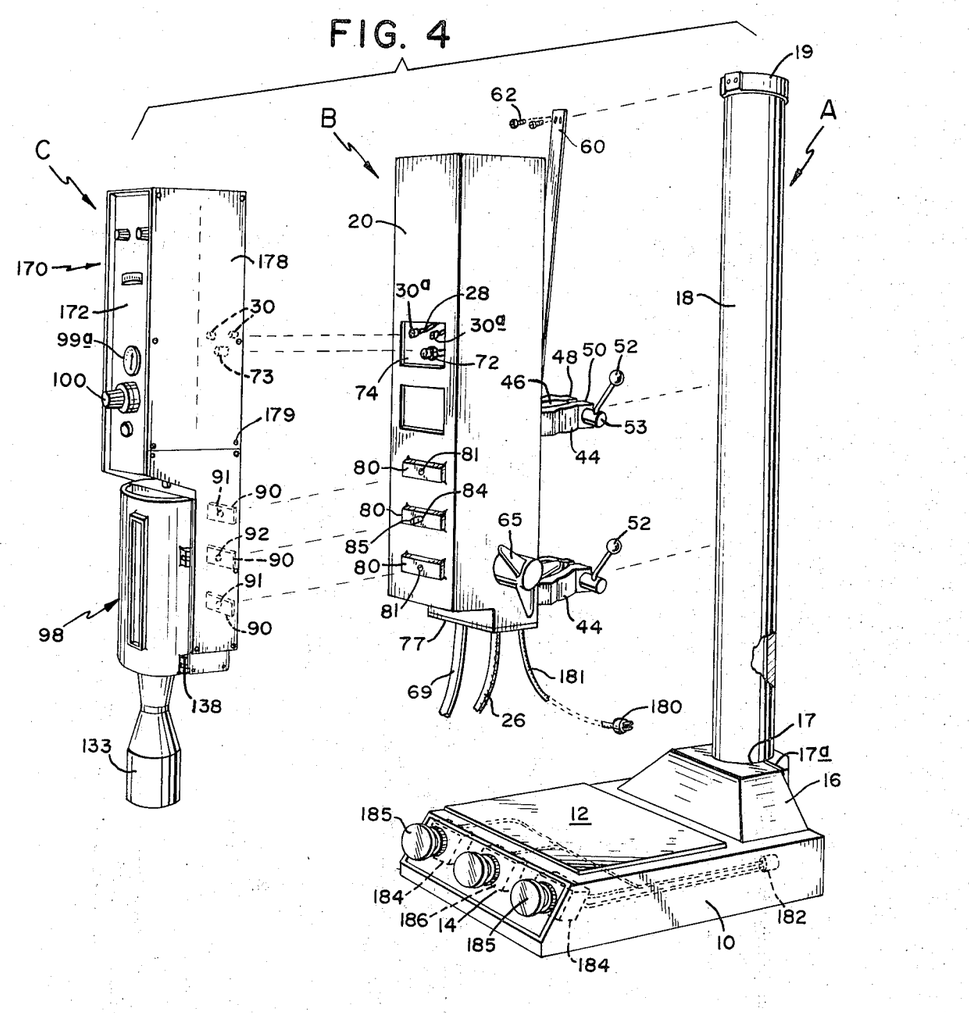
FIG. 4 is an exploded perspective view of various subassemblies.

Referring now to the figures and FIGS. 1 and 4 in particular, the modular design of the stand is illustrated as comprising three subassemblies A, B and C. It will be noted that subassembly B is fastened to subassembly A in a manner to be movable vertically and horizontally with reference to the work area for accepting a wide variety of workpieces. The subassembly C is removably fastened to subassembly B in a more intimate, well secured manner than is subassembly B to subassembly A, so that together, the subassemblies B and C form a complete unit. Thus an additional feature of this modular construction is that the combined B-C subassembly can be used independently of the subassembly A in association with a variety of other supports such as an arrangement of several B-C units mounted adjacent each other for use in a special manner.

SUBASSEMBLY A

The subassembly A includes an aluminum cast base 10 provided with a substantially horizontal platform 12 acting as a work surface and an inclined front panel 14 for mounting operating switches. An upwardly projecting boss 16 is integrally cast in the base 10 adjacent the platform and is provided with a hole 17 to receive the end of a vertical post 18. One wall of the boss is split as at 17a and is drawn together by screw means (not shown) to clamp the post 18 securely in place. The post 18 is of tubular construction with a heavy wall thickness for rigidity and is covered at its top end with a cap 19.

SUBASSEMBLY B

The subassembly B comprises an enclosure means for an electrical power supply and can be constructed in any suitable manner such as having a housing 20 of cast aluminum, for strength and rigidity, which is divided into an upper compartment 22 (FIG. 5) to receive the electrical power supply components generally indicated 23, and a lower compartment 24 for miscellaneous components. A cable 26 brings the low frequency electrical energy from a suitable source, not shown, into the power supply components 23 from which high frequency power is delivered through the short cables 28 and the connectors 30a into the subassembly C. Both compartments are enclosed by a common cover 32 held in place by screws 34 in tapped holes 35 in the housing 20. The upper end of the housing is provided with a louvered opening 36 to vent the power supply compartment 22. The cooling of this compartment is aided by the inclusion of an appropriate motor 38 and fan 40.

The attachment of the power supply to the post 18 can be effected by a variety of means. For purposes of illustration, the following combination of elements is used. The back wall of the housing 20 is constructed with two spaced bosses 42 upon each of which is mounted a clamp 44 by screws 45. Each clamp slidably receives the post 18 in a hole 46 for positioning the housing vertically and offset, relative to the post. It will be appreciated that the housing 20 can also be rotatably moved about the post 18 for horizontal positioning. The hole 46 in the clamp 44 has a split wall with ears 48 and 50 projecting from each end of the split wall. These ears are drawn together to force the wall of the hole 46 against the post 18 for securing the housing in a predetermined position thereon. This is accomplished by moving a handle 52 to rotate a bolt 53 in threads 54 of the ear 48 thereby advancing a shoulder 56 in a direction longitudinally of the bolt against the ear 50 to force it in the direction of the ear 48. It naturally follows that by reversing the rotation of the bolt 53, the shoulder 56 moves away from the ear 50 allowing the ears to revert to their normal spaced position, due to the inherent resilience of the material from which they are constructed.

Figure 5:
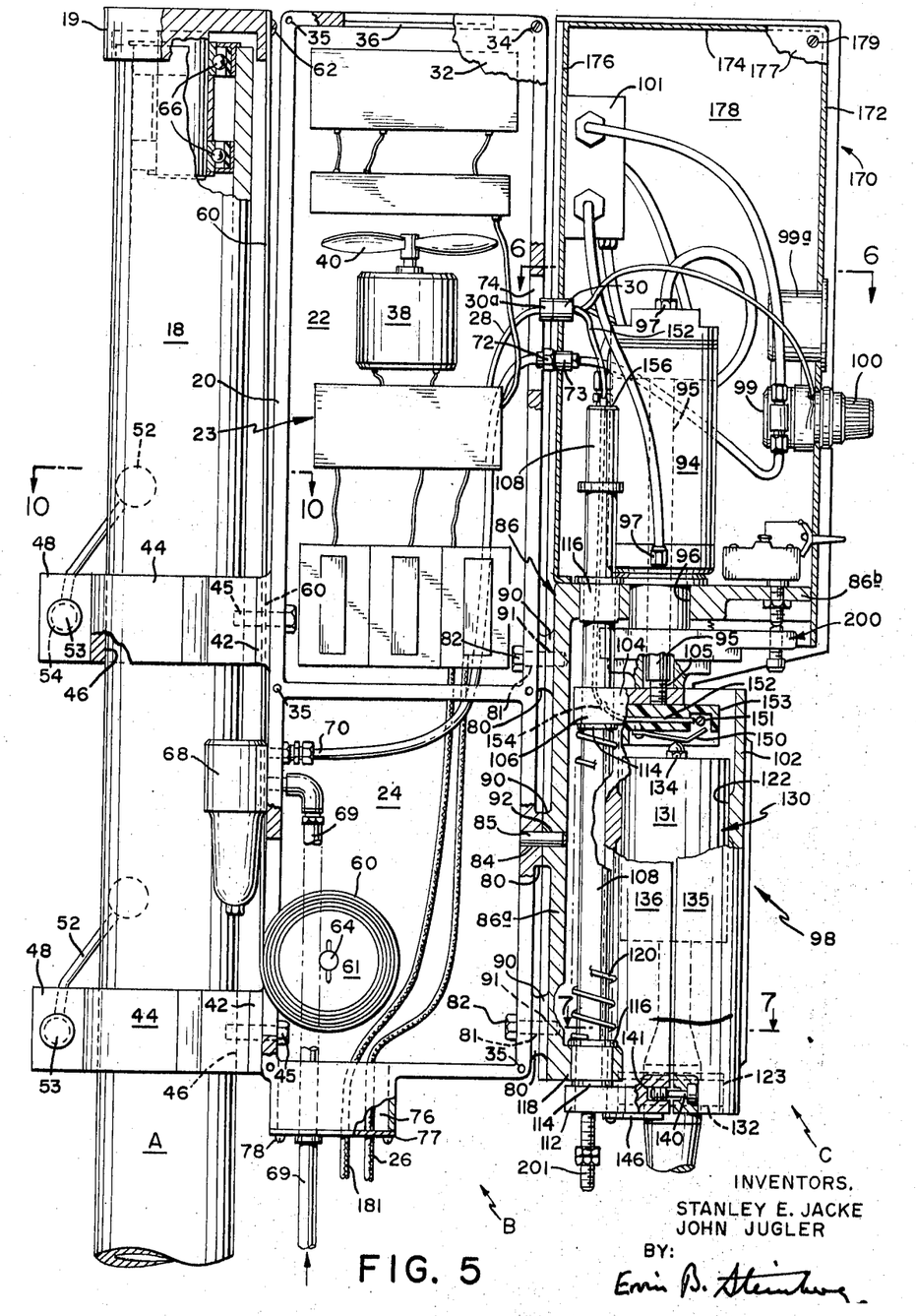
FIG. 5 is a side elevational view, with covers removed and partly in section of an assembled unit, exclusive of the base.
Figure 6:
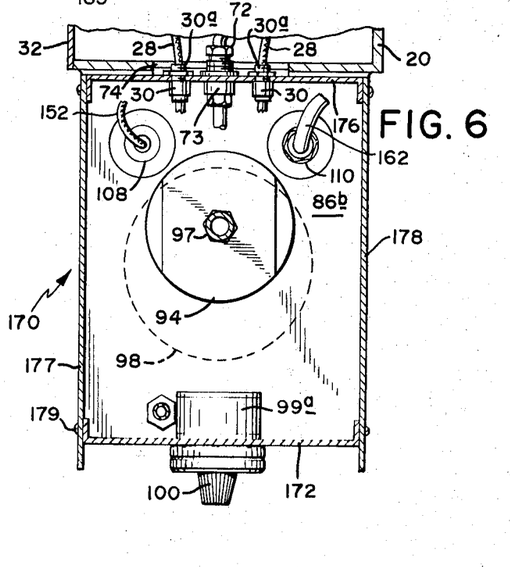
FIG. 6 is a sectional view taken along line 6—6 in FIG. 5.

A further attachment between the housing 20 and the post 18 is provided by a counterbalancing device comprising a constant tension spring 60 wound upon a drum 61 with the free end of the spring being attached to the cap 19 with screws 62 as best seen in FIG. 5. The drum 61 is mounted in the compartment 24 upon a shaft 64 by which it is driven. The shaft furthermore projects through a wall of the housing 20. When the clamps 44 are loose upon the post 18, as described above, the housing is supported against gravity by the spring 60 and can be moved vertically upon the column by manually rotating a knob 65 attached to the end of the shaft 64 to wind or unwind the spring upon the drum for respectively raising or lowering the housing. The cap 19 is mounted upon the top end of the post 18 by bearings 66 in order that the cap can rotate as the housing is horizontally positioned in a rotatable manner about the post.

The housing 20 also carries an air filter 68 with an attached inlet pipe 69 from a suitable source of compressed air and an outlet pipe 70 to deliver air to a fitting 72 positioned in an opening 74 in the housing 20 for mating with a suitable fitting 73 in the adjacent subassembly C. A sleeve-like opening 76 is cast in the lower end of the housing 20 through which the inlet pipe 69 and the electrical cable 26 enter, these being the only attachments to outside sources. A suitable cover 77 is secured by screws 78 to close the opening 76.

In order to mount the subassembly C to the housing 20 there are provided three spaced bosses 80 in the front wall. The top and bottom bosses have clearance holes 81 to receive attaching screws 82 while the center boss has a reamed hole 84 to receive a dowel 85 for securing the subassemblies B and C against relative movement.

SUBASSEMBLY C

The subassembly C comprises another enclosure means. It includes a main support, generally indicated 86, having a vertical section 86a and a horizontal section 86b in the shape of an inverted L. This support is also constructed of cast aluminum and the vertical section 86a is formed with three spaced bosses to match the three bosses 80 on the housing 20. These three bosses on the main support 86 are identified by numeral 90, the top and bottom ones are provided with tapped holes 91 to receive the screws 82 and the center boss has a reamed hole 92 to match the hole 84 and to receive, in a closely fitting manner, the dowel 85.

A pneumatic cylinder 94 having a reciprocatabe piston rod 95 is mounted upon the horizontal section 86b of the main support 86. The rod 95 extends vertically through a suitable opening 96 and attaches at its free end to a carriage 98 which is driven thereby. Suitable hoses are connected to fittings 97 on the cylinder 94 for delivering compressed air from the fitting 73 (described above) through a pressure control 99 and a solenoid operated four-way valve 101. The control 99 is manually set by turning a knob 100 attached thereto.

Figures 7, 8, 9, 10:
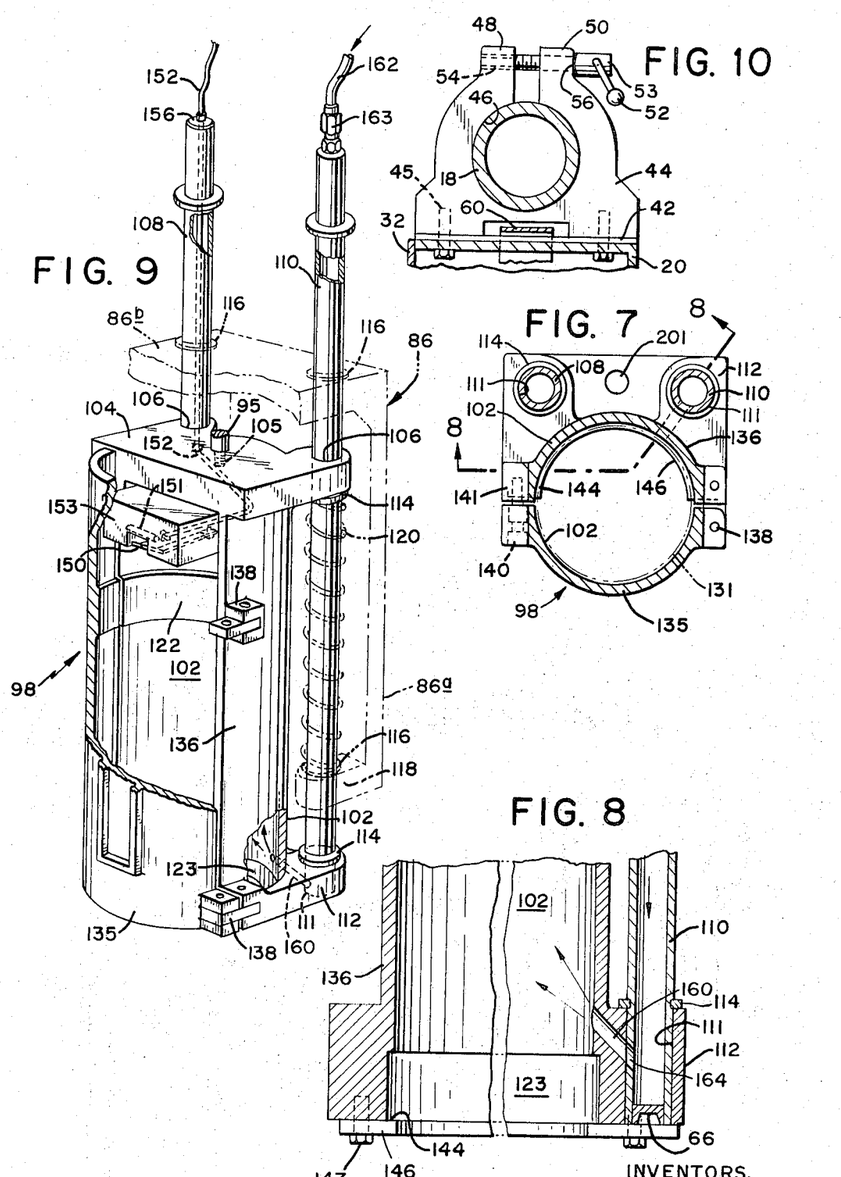
FIG. 7 is a sectional view taken along line 7—7 in FIG. 5.
FIG. 8 is a sectional elevational view taken along line 8—8 in FIG. 7.
FIG. 9 is a perspective view of the carriage, broken away to show special features.
FIG. 10 is a sectional view taken along line 10—10 in FIG. 5.

As clearly shown in FIG. 9, the carriage wall 102 is of substantially cylindrical shape having a boss 104 across its top end which is threaded to receive a threaded end 105 of the piston rod 95. The boss 104 overhangs the outside wall of the carriage and is further provided with two spaced holes 106 which carry two guide rods 108 and 110, for additional support of the carriage 98. For reasons set forth below, these rods serve additional purposes by being hollow, or constructed from tubular material. The spaced holes 106 are so oriented as to allow the guide rods to extend longitudinally outside the carriage wall 102 in spaced relation thereto. The ends of the rods 108 and 110 are secured in two similarly spaced holes 111 in a lower boss 112 projecting from the lower end of the carriage wall 102. Retaining rings 114 secure the guide rods 108 and 110 against relative movement between them and the carriage 98. Each of the guide rods is slidably mounted in two spaced bushings 116 in the main support 86 for vertical movement with the carriage 98. A spring 120 encircles each of the rods 108 and 110 and is mounted for coaction between one of the bushings 116, in a lower boss 118 in the main support section 86a, and the upper boss 104 on the carriage 98 for resiliently supporting the carriage in a normally raised position when the air cylinder 94 is not in operation.

Figure 2:
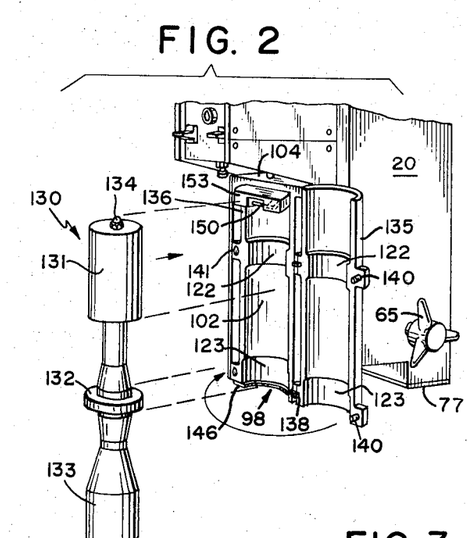
FIG. 2 is a perspective view of the carriage portion of the apparatus with open panel, ready to receive a converter-horn assembly.

The carriage 98 is provided with machined surfaces 122 and 123 in the inner portion of the wall 102 for supporting, in a clamping manner, a converter-horn assembly 130. This assembly includes an electro-acoustic converter 131, which as described heretofore converts applied high frequency electrical energy to acoustic energy, and a support ring 132, and a suitable horn 133 as best shown in FIG. 2. The horn 133, also known as mechanical amplitude transformer, couples the acoustic energy from the converter 131 to a workpiece.

There is a parting line longitudinally of the carriage wall 102 separating it into two halves to form a swing-open access panel 135 and a chassis 136. This construction provides for a quick and simple insertion and removal of the converter-horn assembly 130. Two hinges 138 at one side of the closure panel 135 and chassis 136 provide the swing-open feature and two captive clamping srews 140 at the opposite side of the panel 135 cooperate with two threaded bosses 141 on the chassis 136 (FIGS. 2 and 7) to clamp the converter-horn assembly 130 in place within the carriage. As seen in FIG. 8, a shelf 144, for supporting the ring 132 against longitudinal movement, is formed by an arcuate shaped plate 146 secured by screws 147 to the bottom of the chassis 136.

Upon insertion of the converter-horn assembly 130 into the chamber formed by the the barrel-shaped chassis 136, an exposed electrical contact button 134 at the top of the converter 131 depresses a leaf spring conductor 150 to make electrical contact with a rod 151 (FIG. 5) for delivering electrical energy to the converter 131. Attached to the rod 151 is an electrical cable 152 for transmitting electrical energy to the rod from the connector 30a, described above. It will be recalled that the connector 30a is coupled to a mating connector 30 and receives energy from the power supply 23 in the subassembly B. The electrical cable 152 extends from the rod 151 through a hole 154 into the hollow guide rod 108 and out the top end of the rod through a suitable fitting 156. The above electrical components, viz. the conductor 150, the rod 151 and cable 152 are mounted in a block 153 of suitable electrical insulating material. Electrical ground connection is established through the converter housing and chassis 136.

In order to prevent excessive accumulation of heat within the chassis 136, a stream of coolant gas in the form of air is directed upwardly around the converter-horn assembly 130 through a duct 160 in the lower end of the wall 102 of the chassis 136. The air for this purpose is derived from the exhausting of the piston 94. This exhaust air is delivered through the other hollow guide rod 110 from the control valve 101 through a suitable hose 162 and fitting 163 at the top of the rod. Air enters the duct 160 through a hole 164 in the rod 110 (FIG. 8), the open end of which is stopped by a plug 166 to prevent escape of air.

A wrap around enclosure generally indicated 170 is mounted upon the main support 86 and serves to protect the cylinder 94 and associated components. The enclosure includes a front wall 172, a top 174 and a back wall 176. The front wall 172 serves as an instrument panel and carries a pressure indicator 99a associated with the air pressure control 99, as well as other controls and indicators. It will be appreciated that many electrical components have not been shown in the interest of simplification. The open sides of the wrap around enclosure are closed by covers 177 and 178 attached by screws 179. It will be noted that the back wall also carries certain components such as a pair of electrical connectors 30 and an air fitting 73 for the purpose of operably interconnecting the subassembly B with the subassembly C. The solenoid operated control valve 101 is also mounted upon the back wall 176.

OPERATION

Beginning with the subassemblies A, B and C as described above but disassembled with respect to each other as shown by FIG. 4, the subassembly C is attached to the subassembly B by joining the mating electrical connectors 30 with 30a and the air fittings 72 with 73. The dowel 85 is inserted into the reamed holes 84 and 92 and the screws 82 are secured in the threaded holes 91. The simplicity of the operation must become apparent at this point, in recapitulation, the attaching components being one dowel, two screws and three connecting members.

After attaching subassembly C to subassembly B, they become substantially one unit which will hereafter be called a head. This is now attached to the vertical post 18 by removing the cap 19 at the top of the post and inserting the post 18 into the hole 46 of each of the spaced clamps 44 and moving downwardly on the post. The handles 52 on the clamps 44 are operated to secure the head while the cap 19 is replaced and the free end of the constant tension spring 60 is attached by screws 62 to the cap. The head is unclamped by reverse movement of the handles 52 for further positioning relative to a workpiece W located upon the platform 12 of the base 10.

A connector 180 attached to the end of a cable 181 leading from the head is coupled to a mating connector 182 in the base 10 for including dual action switches 184 and an emergency stop switch 186 in the circuitry.

The head is horizontally positioned above the workpiece by rotating it about the post 18 and also vertically by turning the knob 65. It is held against falling due to gravity by the constant tension spring, when the clamps 44 are disconnected, or in unclamped condition. After the desired location of the head is accomplished, the handles 52 are manipulated to clamp the head securely upon the post 18.

Figure 3:
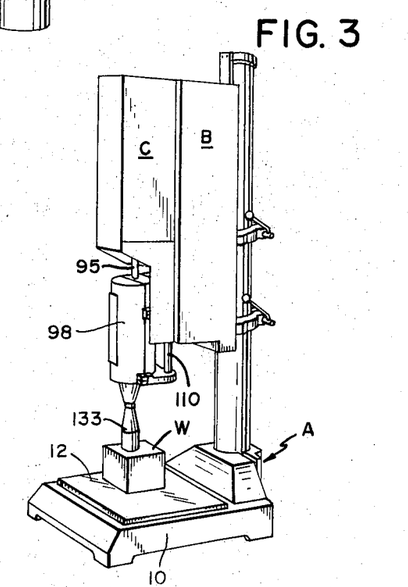
FIG. 3 is an outline drawing similar to FIG. 1 but showing the carriage, with horn assembly, extended to contact a workpiece.

As a safety feature, the operator must actuate substantially simultaneously both of the electrical switches 184 by depressing the corresponding palm buttons 185 to provide the control signal which initiates the working cycle and first triggers the solenoid valve 101, delivering compressed air to the cylinder 94. The air pressure forces the piston rod 95 downwardly, together with the carriage and converter-horn assembly 130, until the horn 133 contacts the workpiece W (FIG. 3) when it operates means for electrically energizing the converter 181 from the power supply 23 to produce acoustic energy in the horn 133 for operation upon the workpiece W. A triggering device 200 (FIG. 5) as disclosed in U.S. Pat. No. 3,493,457 can be used with an adjustable stop 201 secured in the bottom of the main support for initiating the power transfer cycle. After the transfer of acoustic energy is completed, a short dwell time occurs during which the horn remains in engagement with the workpiece W, see FIG. 3. Subsequently the control valve 101 vents the piston 94 and, responsive to this venting of air, the carriage 98 is raised from its lowered workpiece engaging position. The exhausted air, as stated above, is conducted to the chassis to serve as coolant for the converter 131.

From the foregoing description it will readily be appreciated that the construction of the ultrasonic apparatus and of the stand in particular provides a significant advance in the art. Modularly constructed assemblies are bolted together to form a stand which is readily transported between work stations. Additionally, various improvements in providing electrical connection and the placement of actuating controls render the present construction uniquely suited for quick repair, replacement of components and ease of maintenance.

What is claimed is:

1. An ultrasonic apparatus comprising:
   a base having a platform adapted to support a workpiece;
   a post extending from said platform;
   a first enclosure means containing an electrical power supply;
   a second enclosure means having a fluid pressure responsive means adapted to undergo reciprocating motion;
   a carriage adapted to support an electro-acoustic converter coupled to said means adapted to undergo reciprocating motion;
   means disposed for fastening said first enclosure means and said second enclosure means to one another;
   means coacting between said first enclosure means and said post for supporting said first and second enclosure means at an adjustable distance from said platform whereby to provide for motion of said carriage toward and away from said platform responsive to the actuation of said means adapted to undergo reciprocating motion;
   means coupled between said post and enclosure means for counterbalancing the weight of said enclosure means as said enclosure means is moved along said post;
   said carriage means having a barrel-shaped chassis for receiving therein an electro-acoustic converter adapted to provide ultrasonic vibrations in response to applied electrical high frequency energy;
   means associated with said barrel-shaped chassis for clamping the converter in place;
   electrical contact means disposed in said chassis for establishing electrical connection to an electro-acoustic converter disposed in said chassis, and
   means for conducting fluid discharged by said fluid pressure responsive means to said chassis for use as a coolant for an electro-acoustic converter disposed in said chassis.

2. An ultrasonic apparatus as set forth in claim 1, said electrical contact means comprising a contact spring disposed for engagement with an electrical contact provided on the electro-acoustic converter.

3. An ultrasonic apparatus comprising:
   a chassis mounted for reciprocating motion adapted to support an electro-acoustic converter which is adapted to receive high frequency electrical energy and provide in response thereto ultrasonic vibrations;
   an electrical contact converter, receiving such energy disposed at a power supply of said converter; and reciprocating
   an electrical contact spring associated with said chassis disposed to engage said electrical contact of said converter responsive to said converter being disposed in said chassis.

4. An ultrasonic apparatus as set forth in claim 3, the electrical connection between said contact of said converter and said contact spring associated with said chassis being independent of the rotational orientation of said converter.

5. An ultrasonic apparatus comprising:
   a base having a platform adapted to support a workpiece;
   a post extending from said platform;
   a first enclosure means containing an electrical power supply;
   a second enclosure means having means adapted to undergo reciprocating motion;
   a carriage adapted to support an electro-acoustic converter coupled to said means adapted to undergo receiprocating motion;
   means disposed for mechanically coupling said first enclosure means and said second enclosure means to one another;
   means for supporting said first and second enclosure means at an adjustable distance from said platform whereby to provide for motion of said carriage toward and away from said platform responsive to the actuation of said means adapted to undergo reciprocating motion;
   said carriage means having a barrel-shaped chassis for receiving therein an electro-acoustic converter adapted to provide ultrasonic vibrations in response to applied electrical high frequency energy;
   means associated with said barrel-shaped chassis for fixedly clamping the converter in said chassis, and
   electrical contact means disposed in said chassis for engaging the electrical contact means provided on an electro-acoustic converter inserted into said chassis.

6. An ultrasonic apparatus comprising:
   a base having a platform adapted to support a workpiece;
   a post extending from said base;
   enclosure means detachably supported on said post in spaced relation to said platform and adjustable on said post toward and away from said platform and parallel thereto;
   said enclosure means having a first portion containing an electrical power supply operable to convert electrical power from network frequency to high frequency, and a second portion containing drive means operable to generate reciprocating motion in a direction toward and away from said platform;
   converter mounting means coupled to said drive means for reciprocating motion thereby toward and away from said platform and constructed and arranged to removably receive therein an electro-acoustic converter;
   an electro-acoustic converter removably mountable in said mounting means having an electrical contact thereon for connection to the high frequency electrical power supply to convert the electrical high frequency to sonic vibration for operation on a workpiece on the platform, and
   electrical contact means on said mounting means connected to the high frequency electrical power supply and positioned for engagement by the electrical contact on the converter upon insertion of the converter in said mounting means for connecting said converter to the high frequency electrical power supply.

7. An ultrasonic apparatus as set forth in claim 6, and control means disposed on said base and connected to the power supply for causing energization of said electroacoustic converter to operate on a workpiece on the platform of the base.

8. An ultrasonic apparatus as set forth in claim 6, said first portion and said second portion forming separable assemblies; means for securing said assemblies to each other, and means for removably attaching said first portion to said post.

9. An ultrasonic apparatus as set forth in claim 8, and mating electrical connecting means disposed in each portion to provide electrical interconnection between said assemblies when said assemblies are secured to one another.

10. An ultrasonic apparatus comprising:
a base having a platform adapted to support a workpiece;
a post extending from said base;
a first enclosure detachably supported on said post in spaced relation to said platform and adjustable on said post toward and away from said platform and parallel thereto;
an electrical power supply in said first enclosure and operable to convert electrical power from network frequency to high frequency;
a second enclosure detachably connected to the first enclosure;
drive means in said second enclosure operable to generate reciprocating motion toward and away from said platform;
converter mounting means on said second enclosure coupled to said drive means for reciprocating motion thereby toward and away from said platform and constructed and arranged to removably receive therein an electro-acoustic converter;
an electro-acoustic converter removably mountable in said mounting means having an electrical contact thereon for connection to the high frequency electrical power supply to convert the electrical high frequency to sonic vibration for operation on a workpiece on the platform;
electrical contact means on said mounting means positioned for engagement by said electrical contact on the converter upon insertion of the converter in said mounting means, and
electrical conductor means connecting the high frequency output of the electrical power supply in said first enclosure to the electrical contact means on said converter mounting means of said second enclosure for supplying high frequency electrical power to said electro-acoustic converter.

11. An ultrasonic apparatus as set forth in claim 10, said converter mounting means including a chamber having an access opening for inserting and supporting the converter.

12. An ultrasonic apparatus as set forth in claim 11, said access opening having a hinge mounted closure therefor, and means coacting between said chamber and closure for retaining said closure in closed position against said chamber.

13. An ultrasonic apparatus as set forth in claim 10, said drive means including a pneumatically actuated piston means, and means for conducting gas discharged from said piston means to said chamber for cooling an electro-acoustic converter supported in said chamber.

14. An ultrasonic apparatus as set forth in claim 10, and a constant tension spring disposed between said post and said first enclosure for counterbalancing, at least partially, the weight of said enlosures when moving the first and second enclosures along said post.

* * * * *

PO-1050
(5/69)

UNITED STATES PATENT OFFICE
CERTIFICATE OF CORRECTION

Patent No. 3,790,059           Dated February 5, 1974

Inventor(s) STANLEY E. JACKE and JOHN JUGLER

It is certified that error appears in the above-identified patent and that said Letters Patent are hereby corrected as shown below:

In the Abstract, last word, "displacement", should be--replacement--

Column 4, line 22, the word "reciprocatabe", should be--reciprocatable--

Column 7, in Claim 3, cancel lines 59 through 61 and substitute:

--an electrical contact for receiving such energy disposed at a surface of said converter, and--

Signed and sealed this 9th day of April 1974.

(SEAL)
Attest:

EDWARD M. FLETCHER, JR.        C. MARSHALL DANN
Attesting Officer                Commissioner of Patents